United States Patent [19]

Tkachuk

[11] 3,713,189
[45] Jan. 30, 1973

[54] FISH CLAMPING TABLE

[76] Inventor: John Tkachuk, c/o Invention Development Foundation, 155 Kent Street, Sudbury, Ontario, Canada

[22] Filed: Feb. 16, 1972

[21] Appl. No.: 226,657

[52] U.S. Cl. .................................................. 17/70
[51] Int. Cl. ............................................ A22c 25/00
[58] Field of Search ........................ 17/70; 248/361

[56] References Cited

UNITED STATES PATENTS 1,353,981  9/1920  Bahde .................................. 17/70
2,838,787  6/1958  Hickey ................................. 17/70

Primary Examiner—Robert Peshock

[57] ABSTRACT

A table for cleaning fish having a clamp member at one end of the table to engage the head or tail of the fish, the clamp member comprising a pair of spaced apart, arcuate arms passing through openings in the table, the arms having a transversal fish engaging member therebetween. One side of each arm is provided with teeth enmeshing with toothed guide wheels mounted subjacent the table, the guide wheels being lockable in various positions, depending on the size of the fish being cleaned.

7 Claims, 5 Drawing Figures

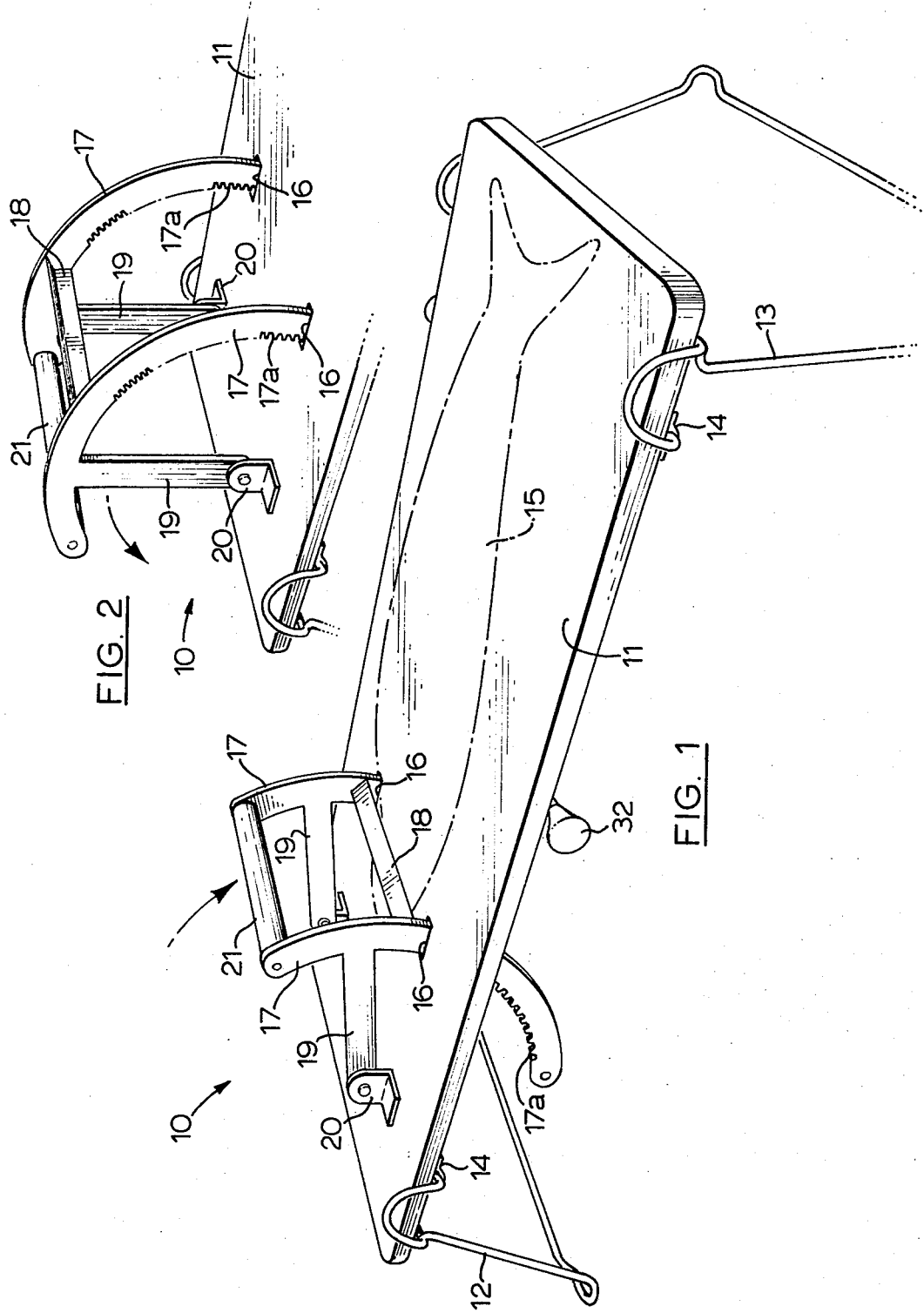

FISH CLAMPING TABLE

This invention relates to a table for cleaning fish wherein clamping means are provided for securing a fish to facilitate the cleaning thereof.

The unpleasantness of preparing fish for cooking is well known. Hitherto, devices designed to aid in cleaning fish, particularly those designed for sportsmen or for home use, are generally unsatisfactory, either due to a high manufacturing cost or inherent deficiencies such as inefficient operation.

The present invention provides a fish clamping table that may be utilized for cleaning fish having a wide range of sizes, may be manufactured at a relatively low cost, is efficient and safe in operation, may be readily transported or compactly stored, and is simple to operate.

The various objects and features of the invention will become more readily apparent from the following detailed description of a preferred embodiment wherein reference will be made to the accompanying drawings in which:

FIG. 1 is a perspective view of the invention in operation,

FIG. 2 is a perspective view of the clamp member in the raised position,

Figure 3:
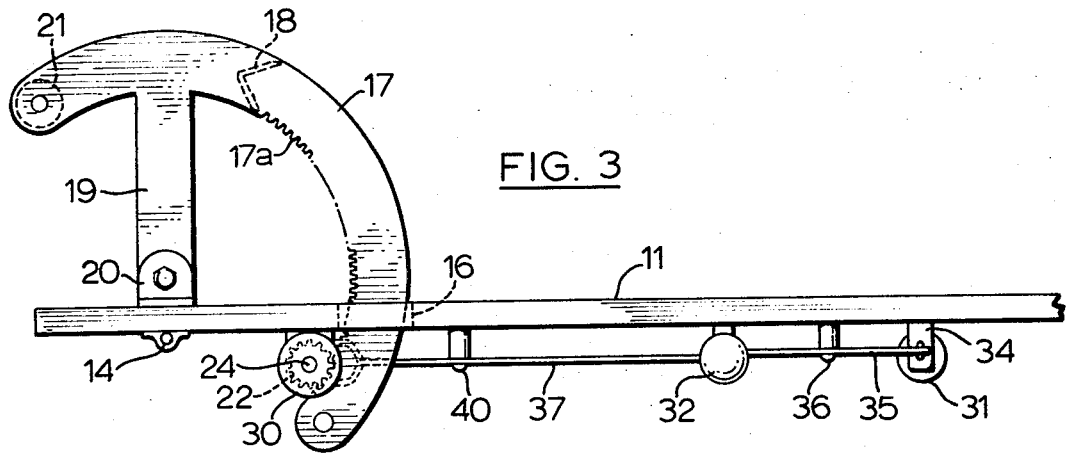
FIG. 3 is a side elevational view.

The fish clamping table of this invention, indicated generally as 10, includes a table 11 supported by the legs 12 and 13 at each end thereof, the legs 12 and 13 being pivotally mounted by means of the brackets 14 secured to the under surface of the table 11. The structure of the legs 12 and 13 are such that they may be easily removed if desired as well as being foldable inwardly towards the under surface of the table 11.

The fish 15, shown in phantom, is illustrated in a preferred position for cleaning. The outline of a fish may be imprinted or engraved on the upper surface of the table 11 to illustrate this preferred manner of utilizing the device 10 as well as for decorative purposes.

A pair of spaced apart openings 16 are provided near the forward end of the table 11, the openings 16 receiving therethrough the arcuate arms 17 which carry the clamping member 18 therebetween. Each of the arcuate arms 17 has a radial support arm 19 pivotally secured to one of the brackets 20 mounted on the table 11 in substantial alignment with the openings 16. A handle 21 extends between the arcuate arms 17 adjacent the upper ends thereof. The clamping member 18 is arcuately formed or angled in transversal cross-section to provide two parallel clamping edges. These clamping edges may be toothed or serrated to increase the hold on the fish being cleaned.

Figure 4:
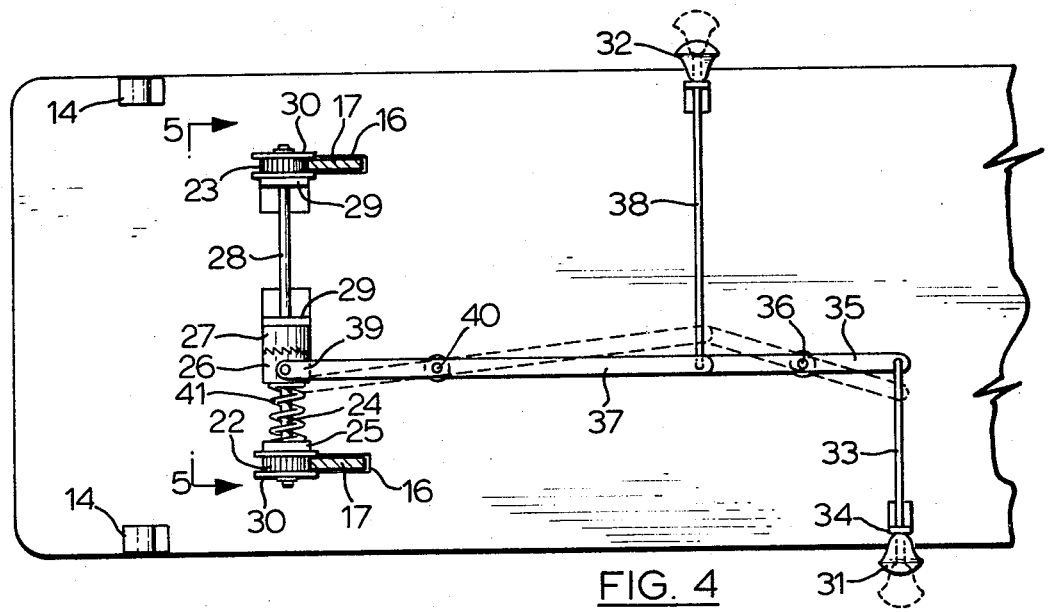
FIG. 4 is a bottom plan view.
Figure 5:
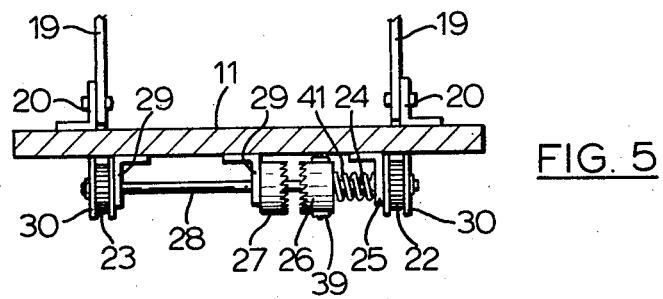
FIG. 5 is a sectional view taken on the line 5—5 of FIG. 4.

Each of the arcuate arms 17 is provided with a toothed edge 17a meshing with the toothed wheels 22 and 23 mounted subjacent the table 11. The wheels 22 and 23 are rigidly mounted at the ends of the axle 28 which passes through each of the brackets 25 and 29 secured to the under surface of the table 11. The cylindrical member 26 is coaxially mounted on the axle 28 and slidable therealong and coacts with the coaxially mounted cylindrical member 27 rigidly secured to the axle 28, the contiguous faces of the members 26 and 27 being provided with interlocking gooves or teeth. The axle 28 is rotatably mounted by means of the brackets 25 and 29. When the members 26 and 27 are engaged, as illustrated in FIG. 4, the axle 28, together with the wheels 22 and 23, is prevented from rotating, thereby locking the arcuate arms 17 and the clamping member 18 in position.

The flanges 30 provided with each of the wheels 22 and 23 serve to guide the arcuate arms 17. It will be observed that the flanges 30 may be made integrally with the wheels 22 and 23, or may comprise disks contiguous with each side of each wheel.

The release knobs 31 and 32 are provided on opposite sides of the table 11, and either of knobs 31 or 32 may be used to disengage the cycindrical members 26 and 27 to raise or lower the clamping member 18. The knob 31 is secured to the end of the connecting rod 33 which passes through the retaining bracket 34 and communicates with the end of the lever 35. The lever 35 is pivotally mounted at 36, substantially at the midpoint along the length thereof. The lever 35 is in communication with the lever 37 which, through the connecting rod 38, may also be activated by means of the knob 32. The lever 37 is an extention of the yoke member 39, the arms of which are secured to opposite sides of the cylindrical member 26. The lever 37 is pivotally mounted at 40. The coil spring 41, coaxially mounted on the end 24 of the axle 28, biases the cylindrical member 26 into engagement with the cylindrical member 27.

In operation, a fish is placed on the table 11 so that either its head or its tail will be engaged by the clamping member 18. It is normally preferred to have the fish located substantially as illustrated in FIG. 1 so as to be secured to the table 11 with the clamping member 18 adjacent to its gills.

With either hand disengaging the locking mechanism through either knob 31 or 32, the other hand, by means of the handle 21, brings the clamping member 18 into engagement with the fish 15. The knob 31 or 32 is then released, allowing the spring 41 to bias the cylindrical member 26 into interlocking engagement with the cylindrical member 27, whereby further movement of the clamping member 18 is prevented until it is desired to release the fish 15.

All the usual cleaning operations are facilitated in using the invention, including scaling, skinning, and filleting. Further, it is apparent that the invention will accommodate fish having a wide range of sizes.

While the invention has been described and illustrated in the form of a table provided with legs, it is to be understood that other adaptations are envisaged, including a board that may be clamped to a table or counter, or a board which may be foldably or slidably recessed into a counter or wall when not in use, for example. Various other changes may be made in the design, construction, or arrangement of parts such as may fall within the scope of the following claims.

What I claim is:

1. A fish clamping table comprising: a clamp means at one end of said table, said clamp means including a pair of arcuate arms, a clamping member between said arms, one edge of each said arm being provided with teeth, a pair of spaced apart openings in said table, said openings receiving said arms therethrough, a toothed guide wheel mounted adjacent each said opening and subjacent said table, the said teeth enmeshing with the said guide wheels, and locking means in communication with said guide wheels whereby said clamping member may be locked in position when engaging a fish.

2. A fish clamping table as claimed in claim 1 in which said clamping member is arcuate in transversal section whereby a pair of parallel fish engaging edges are provided therewith, each of said edges being serrated.

3. A fish clamping table as claimed in claim 1 in which a handle extends between said arcuate arms adjacent the upper ends thereof.

4. A fish clamping table as claimed in claim 1 in which said guide wheels are rigidly mounted adjacent the ends of an axle, said axle being rotatably mounted subjacent said table by bracket means, a first cylindrical member coaxial with said axle and slidable therealong, a second cylindrical member coaxial with said axle and rigidly secured thereto, interlocking means with the adjacent faces of said first and second cylindrical members whereby upon said faces being contiguous the said axle and said guide wheels are prevented from rotating, thereby providing said locking means.

5. A fish clamping table as claimed in claim 1 in which each of said arcuate arms has a radial support arm pivotally secured to bracket means mounted on said table.

6. A fish clamping table as claimed in claim 1 in which said table is provided with legs at each end thereof, the said legs being pivotally mounted by means of brackets secured to the under surface of said table, the said legs being foldable inwardly towards the under surface of said table, and the said legs being removable.

7. A fish clamping table as claimed in claim 1 in which said guide wheels being rigidly mounted at the ends of an axle, said axle being rotatably mounted subjacent said table by bracket means, a first cylindrical member coaxizlly mounted on said axle and slidable therealong, a second cylindrical member coaxially mounted on said axle and rigidly secured thereto, the adjacent faces of said cylindrical members being provided with teeth, a coil spring coaxially mounted on said axle and biasing said first cylindrical member into interlocking engagement with said second cylindrical member, a first release knob at one side of said table, a second release knob at the opposite side of said table, lever means communicating each of said release knobs with said first cylindrical member whereby said locking means may be disengaged to raise or lower said clamping member.

* * * * *